United States Patent Office 3,481,968
Patented Dec. 2, 1969

3,481,968
PREPARATION OF HALOGENATED AROMATIC
ISOCYANATES
Gerhard F. Ottmann and Ehrenfried H. Kober, Hamden, and David F. Gavin, New Haven, Conn., assignors to Olin Mathieson Chemical Corporation, a corporation of Virginia
No Drawing. Continuation-in-part of application Ser. No. 539,308, Apr. 1, 1966. This application Oct. 2, 1967, Ser. No. 671,949
Int. Cl. C07c 119/04
U.S. Cl. 260—453                                   15 Claims

ABSTRACT OF THE DISCLOSURE

Halogenated aromatic isocyanates are prepared by reacting an aromatic nitro compound with carbon monoxide and a halogenated oxide of carbon or tetravalent sulfur in the presence of at least one metal-based catalyst. The proportion of said halogenated oxide is generally equivalent to between about 0.125 and about 10 moles per mole of nitro groups in the aromatic nitro compound. The halogenated aromatic isocyanates are reacted with polyether polyols to form polyurethane compositions.

---

This application is a continuation-in-part of co-pending application Ser. No. 539,308, filed Apr. 1, 1966, now abandoned.

This invention relates to the preparation of halogenated organic isocyanates.

There is an increasing demand for halogenated organic isocyanates for use in the preparation of urethane foams and coatings having flame-retardant properties, as well as in the preparation of insecticides, pesticides and the like.

The usual commercial process for preparing halogenated organic isocyanates is very complex and expensive. The process requires the catalytic hydrogenation of an organic nitro compound to form the corresponding amine, followed by reaction of the amine with phosgene to form the corresponding isocyanate, which then, in an additional step, has to be halogenated. Halogenated organic isocyanates can also be prepared by phosgenation of chlorinated amines. A suitable technique for halogenating organic amines is disclosed in U.S. Patent No. 3,236,887, issued Feb. 22, 1966, to Haywood Hooks, Jr. and Gerhard F. Ottmann.

Still another method for preparing halogenated isocyanates is to halogenate organic nitro compounds, which then have to be hydrogenated to halogenated amines and which then have to be reacted with phosgene to form halogenated isocyanates. However, catalytic hydrogenation of halogenated nitro compounds is often accompanied by partial replacement of halogen by hydrogen atoms and thus results in low yield of the desired halogenated amines. Although the loss of halogen can be avoided when nitro compounds are chemically reduced to halogenated amines, this method is economically not attractive, and both catalytic hydrogenation and chemical reduction of chlorinated nitro compounds require a multiplicity of steps in order to produce halogenated isocyanates.

Thus, there is a need in the industry for a simple economic process for preparing halogenated aromatic isocyanates from aromatic nitro compounds.

It is an object of this invention to provide a novel process for preparing halogenated aromatic isocyanates.

Still another object of this invention is to provide a process for preparing halogenated aromatic isocyanates in which halogenation is effected simultaneously with the formation of the aromatic isocyanate.

It is another object of this invention to provide a novel process for preparing 2,4-dichlorophenyl isocyanate.

A further object of the invention is to provide a novel process for preparing 2,4,6-trichlorophenyl isocyanate.

Still another object of the invention is to provide a novel process for preparing trichlorophenyl isocyanate directly from 2,5-dichloronitrobenzene.

These and other objects of this invention will be apparent from the following detailed description thereof.

It has now been discovered that the above-mentioned objects are accomplished when an aromatic nitro compound is reacted with carbon monoxide and a halogenated oxide of an element selected from the groups consisting of carbon and tetravalent sulfur in the presence of at least one metal-based catalyst. The proportion of halogenated oxide of carbon or tetravalent sulfur is generally equivalent to between about 0.125 and about 10 moles of the halogenated oxide per mole of nitro groups in the aromatic nitro compound.

While the theory of the reaction is not completely understood, it has been established that carbon dioxide and a hydrogen halide are produced as by-products of the reaction. When a thionyl halide is employed as the halogenated oxide, the by-products also include phosgene and sulfur dioxide.

It has been reported [H. Meyer, Monatshefte für Chemie, 36, 723 (1915 and Houben-Weyl, Methoden der Organischen Chemie, vol. 5/3, page 872)], that the action of thionyl chloride upon nitrobenzene at 150–200° C. under pressure affords chlorobenzene in practically quantitative yield. It should be noted that this reaction proceeds exclusively under cleavage of the nitrogen-carbon bond in nitrobenzene, and that no chloronitro benzenes are formed. In view of this, it is rather surprising that the reaction of nitrobenzene with thionyl chloride and carbon monoxide, in the presence of a suitable catalyst, affords chlorinated reaction products in which the original carbon-nitrogen bond is still retained.

More in detail, any aromatic nitro compound capable of being converted to a halogenated aromatic isocyanate may be employed as a reactant. As used herein, the term "aromatic nitro compound" represents those organic compounds having at least one nitro group attached directly to an aromatic nucleus such as benzene, naphthalene, and the like, wherein the aromatic nucleus may also contain other substituents as illustrated below. Among the preferred organic nitro compounds which may be used in the practice of this invention are the nitrobenzenes, both mono- and polynitro, including isomeric mixtures thereof; the alkylnitrobenzenes, including the various nitrated toluenes and the nitrated xylenes; nitrated biphenyl and nitrated diphenylmethanes. Other preferred reactants include bis(nitrophenoxy) alkanes and bis(nitrophenoxy)alkylene ethers. Typical examples of suitable aromatic nitro compounds which can be reacted to form halogenated isocyanates include the following:

(a) Nitrobenzene
(b) Nitronaphthalenes
(c) Nitroanthracenes
(d) Nitrobiphenyls
(e) Bis(nitrophenyl)methanes
(f) Bis(nitrophenyl)thioethers
(g) Bis(nitrophenyl)ethers
(h) Bis(nitrophenyl)sulfones
(i) Nitrodiphenoxy alkanes
(j) Nitrophenothiazines All of the aforementioned compounds may be substituted with one or more additional substituents such as nitro, alkyl, alkoxy, aryloxy, halogen, alkylthio, arylthio, carboxyalkyl, cyano, isocyanato, and the like, and employed as reactants in the novel process of this invention.

Specific examples of suitable substituted-nitro compounds which can be used are as follows:

(1) o-nitrotoluene
(2) m-nitrotoluene
(3) p-nitrotoluene
(4) o-nitro-p-xylene
(5) 2-methyl-1-nitronaphthalene
(6) m-dinitrobenzene
(7) p-dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrobibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) Bis(p-nitrophenxoy)diethylene ether
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(26a) Nitrodiphenyl methane
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) Alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) Alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-dibromo-p-nitrotoluene
(42) α-bromo-p-nitrotoluene
(43) 1-fluoro-4-nitrobenzene
(44) 1-fluoro-2,4-dinitrobenzene
(45) 1-fluoro-2-nitrobenzene
(46) o-nitrophenyl isocyanate
(47) m-nitrophenyl isocyanate
(48) p-nitrophenyl isocyanate
(49) o-nitroanisole
(50) p-nitroanisole
(51) p-nitrophenetole
(52) o-nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-nitrobenzaldehyde
(58) p-nitrobenzaldehyde
(59) p-nitrobenzoylchloride
(60) m-nitrobenzoylchloride
(61) 3,5-dinitrobenzoylchloride
(62) Ethyl p-nitrobenzoate
(63) methyl o-nitrobenzoate
(64) m-nitrobenzenesulfonylchloride
(65) p-nitrobenzenesulfonylchloride
(66) o-nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-nitrobenzonitrile
(71) m-nitrobenzonitrile
(72) 3,3'-dimethoxy-4,4-dinitro-biphenyl
(73) 3,3'-dimethyl-4,4'-dinitro-biphenyl
(74) 2-isocyanato-4-nitrotoluene
(75) 4-isocyanato-2-nitrotoluene In addition, isomers and mixtures of the aforesaid organic nitro compounds and substituted organic nitro compounds may also be employed, as well as homologues and other related compounds. Generally the aromatic nitro compounds and substituted aromatic nitro compounds contain between about 6 and about 14 carbon atoms.

Any halogenated oxide of an element selected from the group consisting of carbon and tetravalent sulfur which is capable of effecting the transformation of an organic nitro compound to a halogenated organic isocyanate may be employed as a reactant in the process of this invention. Typical examples of suitable halogenated oxides of carbon or tetravalent sulfur include thionyl chloride ($SOCl_2$), thionyl bromide ($SOBr_2$), thionyl chlorobromide ($SOClBr$), phosgene ($COCl_2$), carbon oxybromide ($COBr_2$), carbon oxyfluoride ($COF_2$) mixtures thereof and the like.

The proportion of halogenated oxide of carbon or tetravalent sulfur admixed with the aromatic nitro compound depends on the number of halogen atoms to be introduced into the aromatic ring and is generally equivalent to a molar ratio of halogenated oxide per mole of nitro groups in the aromatic nitro compound in the range between about 0.125:1 and about 10:1, preferably in the range between about 0.2:1 and about 8:1 and more preferably in the range between about 0.5:1 and about 3:1.

Catalysts which may be employed in the novel technique of this invention include elements and compounds of elements found in Groups Ib, IIb, IIIa, IIIb, IVa, IVb, Va, Vb, VIa, VIb, VIIa, VIII and the lanthanide series of the Periodic Table. When comparing the effectiveness as a catalyst of a given weight of these metals and compounds of metals, it was found that certain metals and compounds of these metals had a much greater catalytic effect than others. Those metals, in elemental or compound form, which are preferred because they show the greatest catalytic effect, are as follows:

(1) Palladium
(2) Rhodium
(3) Vanadium
(4) Molybdenum
(5) Tungsten
(6) Tantalum
(7) Chromium
(8) Niobium
(9) Platinum
(10) Cobalt
(11) Nickel
(12) Germanium
(13) Tin
(14) Osmium
(15) Silver
(16) Copper
(17) Titanium
(18) Ruthenium Other metals which may also be employed as a catalyst either in elemental or a compound form, but which are less effective than those listed above are as follows:

(1) Aluminum
(2) Scandium
(3) Manganese
(4) Iron
(5) Zinc
(6) Gallium
(7) Yttrium
(8) Zirconium
(9) Thulium
(10) Masurium
(11) Ytterbium
(12) Cadmium
(13) Indium
(14) Lanthanum
(15) Hafnium
(16) Silicon
(17) Rhenium
(18) Iridium
(19) Lutecium
(20) Gold
(21) Mercury
(22) Thallium
(23) Lead
(24) Cerium
(25) Praseodymium
(26) Neodymium
(27) Illinium
(28) Samarium
(29) Europium
(30) Gadolinium
(31) Terbium
(32) Dysprosium
(33) Holmium
(34) Erbium Compounds of the above elements which can be utilized in the process of this invention include oxides, sulfates, nitrates, halides, carbonates, sulfides, oxalates, and the like, and preferably a compound of one of the aforesaid preferred elements. Included in the latter group are platinum oxide, platinum dioxide, platinum dibromide, platinum dichloride, platinum tetrachloride, platinous cyanide, and platinum sulfate; palladium halides such as palladium dibromide, palladium dichloride, palladium difluoride, and palladium diiodide; rhodium halides such as rhodium tribromide, rhodium trichloride, rhodium trifluoride, and rhodium triiodide; palladium oxides such as palladium suboxide ($Pd_2O$), palladium monoxide (PdO), and palladium dioxide ($PdO_2$); rhodium oxides such as rhodium monoxide (RhO), rhodium sesquioxide ($Rh_2O_3$), and rhodium dioxide ($RhO_2$); chromic oxide ($Cr_2O_3$), chromium dioxide ($CrO_2$), and chromous oxide (CrO); molybdenum sesquioxide ($Mo_2O_3$), molybdenum dioxide ($MoO_2$), and molybdenum trioxide ($MoO_3$); niobium monoxide (NbO), niobium oxide ($NbO_2$), and niobium pentoxide ($Nb_2O_5$); tantalum dioxide ($Ta_2O_2$); tantalum tetraoxide ($Ta_2O_4$), and tantalum pentoxide ($Ta_2O_5$); tungstic oxide ($WO_2$), and tungstic trioxide ($WO_3$); cobaltous chloride ($CoCl_2$); titanium halides such as titanium tetrachloride ($TiCl_4$); tin halides such as tin tetrachloride; and vandium tetraoxide ($V_2O_4$) and vanadium pentoxide ($V_2O_5$), mixtures thereof, and the like.

In addition, carbonyls of certain elements such as nickel, cobalt, iron, rhodium, molybdenum, chromium, tungsten and carbonyl chloride of certain elements such as palladium, rhodium, and any of the aforesaid elements capable of forming carbonyls and carbonyl chlorides can be used as the catalyst. Mixtures of two or more of these compounds may be employed as the catalyst system.

Preferred metal-based catalyst compounds include palladium dichloride, titanium tetrachloride, tin tetrachloride, cobaltous chloride, ruthenium dioxide, palladium dioxide, and mixtures thereof.

The proportion of metal-based catalyst system is generally in the range between about 0.01 and about 100, and preferably between about 0.1 and about 20 percent by weight of the aromatic nitro compound. However, greater or lesser proportions may be employed if desired.

These materials can be self-supported or deposited on a support for dispersing the metal-based catalyst to increase its reactive surface. Alumina, silica, carbon, barium sulfate, calcium carbonate, asbestos, bentonite, diatomaceous earth, fuller's earth, and analogous materials can be used as a catalyst support.

The reaction between carbon monoxide and aromatic nitro compound may be effected in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene and xylene, and halogenated aliphatic and aromatic hydrocarbons such as dichoromethane, tetrachloroethane, monochloronaphthalene, monochlorobenzene, dichlorobenzene, trichloroethylene, and perchloroethylene, as well as sulfur dioxide, mixtures thereof and the like.

The proportion of solvent is not critical and any proportion may be employed which will not require excessively large equipment to contain. Generally the weight percent of aromatic nitro compound in the solvent is in the range between about 5.0 and about 75 percent, but greater or lesser proportions may be employed, if desired.

The order of mixing the reactants is not critical and may be varied within the limitations of the equipment employed. In one embodiment, the aromatic nitro compound, catalyst system, halogenated oxide and, if desired, solvent is charged to a suitable pressure vessel such as an autoclave which was previously purged with nitrogen, and which is preferably provided with agitation means such as a stirrer or an external rocking mechanism. Carbon monoxide is fed into the autoclave until a pressure is attained which is in the range between about 30 and about 10,000 p.s.i.g., and preferably between about 100 and about 8000 p.s.i.g., but greater or lesser pressures may be employed during the reaction if desired.

In another embodiment, one or more of the reactants can be fed continuously into the reactor. For example, the carbon monoxide and halogenated oxide can be fed continuously, either separately or comingled, to a batch of aromatic nitro compounds containing the catalyst in the absence or presence of the solvent. Other modifications will be obvious to one skilled in the art, such as feeding all of the reactants, and solvent, if any, continuously to the reaction while simultaneously withdrawing off-gases and reaction products.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The total amount of carbon monoxide added during the reaction is generally between about 3 and about 50, and preferably between about 8 and 15 moles of carbon monoxide per nitro group in the aromatic nitro compound. Greater or lesser amounts may be employed if desired. The highest carbon monoxide requirements are generally utilized in a process in which the carbon monoxide is added continuously, but suitable recycle of the carbon monoxide-containing gas streams greatly reduces the overall consumption of carbon monoxide.

The reaction temperature is maintained above about 25° C. and preferably between about 100 and about 250° C. Interior and/or exterior heating and cooling means may be employed to maintain the temperature within the reactor within the desired range.

The reaction time is dependent upon the aromatic nitro compound being reacted, the halogenated oxide, the catalyst, and the amount of catalyst being charged, as well as the type of equipment being employed. Usually between one-half hour and 20 hours are required to obtain the desired degree of reaction, but shorter or longer reaction times may be employed.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation technique may be employed to separate the catalyst from the reaction product, and fractional distillation is preferably employed to isolate the halogenated aromatic isocyanate from the reaction product. However, other suitable separation techniques such as extraction, sublimation, etc., may be employed to separate the aromatic isocyanate from the unreacted aromatic nitro compound, unreacted halogenated oxide, and any by-products that may be formed.

Halogenated aromatic isocyanates produced in accordance with the technique of this invention are suitable for use in preparing flame-retardant urethane compounds such as foams, coatings, fibers, and the like by reacting the halogenated aromatic isocyanate with a suitable polyether polyol in the presence of a catalyst and if desired a foaming agent, and as intermediates for biologically active compounds.

The following examples are presented to further illustrate the invention without any intention of being limited thereby.

EXAMPLE 1

A 300 ml. rocking autoclave was charged with 40 g. (0.33 mole) of nitrobenzene, 50 g. (0.42 mole) of thionyl chloride and 1.0 g. of palladium chloride. The reactor was closed, purged and finally pressurized with carbon monoxide to 1100 p.s.i. The reaction mixture was heated to 200–205° C. and kept at this temperature for 3 hours. The maximum pressure at the elevated temperature was 2100 p.s.i. After cooling to room temperature, the autoclave was vented and the reaction mixture distilled. Products of the distillation included phosgene, thionyl chloride, chlorobenzene, unreacted nitrobenzene, 4.0 g. of 2,4-dichlorophenylisocyanate and 5.4 g. of 2,4,6-trichlorophenylisocyanate. The isocyanate products represented a combined corrected yield of 28.2 percent.

EXAMPLE 2

An amount of 30 g. (0.25 mole) of nitrobenzene was reacted with 50 g. (0.42 mole) of thionyl chloride and with carbon monoxide in the presence of 3.5 g. of titanium tetrachloride, as described in Example 1 for 3 hours at 196° C. and at a maximum pressure of 1500 p.s.i. The reaction afforded 2,4-dichlorophenylisocyanate and 2,4,6-trichlorophenylisocyanate in a 1:3 weight ratio and a combined corrected yield of 19.4 percent.

EXAMPLE 3

An amount of 65 g. (0.53 mole) of nitrobenzene was reacted with 100 g. (0.84 mole) of thionyl chloride and with carbon monoxide in the presence of 5.0 g. of tin tetrachloride, as outlined in Example 2, at 210° C. for 3 hours under a maximum pressure of 1600 p.s.i. This reaction produced 2,4-dichlorophenylisocyanate and 2,4,6-trichlorophenylisocyanate in a 1:5 weight ratio and a combined yield of 9 percent.

EXAMPLE 4

An amount of 100 g. (0.83 mole) of nitrobenzene was reacted with 125 g. (1.05 mole) of thionyl chloride and with carbon monoxide, in the presence of 2.5 g. of palladium chloride and 1.0 g. of cobalt chloride, under a maximum pressure of 2150 p.s.i. at 203° C. for 37 hours. The reaction afforded equal amounts of 2,4-dichlorophenylisocyanate and 2,4,6-trichlorophenylisocyante in a combined yield of 20.0 percent.

EXAMPLE 5

An amount of 30 g. (0.25 mole) of nitrobenzene was reacted with 50 g. (0.42 mole) of thionyl chloride and with carbon monoxide in the present of 1.0 g. of ruthenium dioxide, for 18 hours at 200–216° C. under a maximum pressure of 2750 p.s.i. The reaction afforded only 2,4-dichlorophenylisocyanate.

EXAMPLE 6

A 300 ml. rocking autoclave was charged with 25 g. (0.2 mole) of nitrobenzene and 1 g. of palladium oxide. The pressure vessel was closed, cooled to —50° C., charged with 47 g. of phosgene and finally pressurized with carbon monoxide to 900 p.s.i.g. With rocking, the reaction vessel was heated to 182° C. and kept at this temperature for three hours. The maximum pressure on the vessel was 1625 p.s.i.g.

This reaction afforded 1.5 g. of dichlorophenylisocyanate (11 percent corrected yield), traces of trichlorophenylisocyanate, 16 g. of nitrobenzene and minute quantities of chlorobenzene.

Various modifications of the invention, some of which have been referred to above, can be made without departing from the spirit of the invention. What is desired to be secured by Letters Patent is:

1. The process for preparing a halogenated aromatic isocyanate which comprises reacting:
    (a) an aromatic nitro compound containing between about 6 and about 14 carbon atoms,
    (b) a halogenated oxide selected from the group consisting of thionyl chloride, thionyl bromide, thionyl chlorobromide, phosgene, carbon oxybromide, carbon oxyfluoride, and mixtures thereof,
        (1) the proportion of said halogenated oxide being in the range between about 0.125 and about 10 moles of said halogenated oxide per mole of nitro groups in said aromatic nitro compound, and
    (c) carbon monoxide in a proportion equivalent to between about 3 and about 50 moles of carbon monoxide per nitro group in said aromatic nitro compound,
    (d) in the presence of a metal-based catalyst, the proportion of said metal-based catalyst being in the range between about 0.01 and about 100 percent by weight of said aromatic nitro compound,
    (e) at an elevated temperature, and
    (f) an elevated pressure.

2. The process of claim 1 wherein said metal-based catalyst is selected from the group consisting of palladium dichloride, titanium tetrachloride, tin tetrachloride, cobaltous chloride, ruthenium dioxide, palladium dioxide and mixtures thereof.

3. The process of claim 2 wherein the proportion of said halogenated oxide is in the range between about 0.2 and about 8 moles of said halogenated oxide per mole of nitro groups in said aromatic nitro compound.

4. The process of claim 2 wherein said halogenated oxide is thionyl chloride.

5. The process of claim 2 wherein said halogenated oxide is phosgene.

6. The process of claim 2 wherein said halogenated oxide is thionyl bromide.

7. The process of claim 3 wherein said aromatic nitro compound is nitrobenzene.

8. The process of claim 7 wherein said proportion of said metal-based catalyst is in the range between about 0.1 and about 20 percent by weight of said aromatic nitro compound.

9. The process of claim 8 wherein the pressure is maintained in the range between about 30 and about 10,000 p.s.i.g. and the temperature is maintained in the range between about 25° C. and about 250° C.

10. The process of claim 9 wherein said halogenated oxide is thionyl chloride.

11. The process of claim 9 wherein said halogenated oxide is phosgene.

12. The process of claim 3 wherein said aromatic nitro compound is selected from the group consisting of dinitrotoluene and bis(nitrophenyl)methane.

13. The process of claim 12 wherein said proportion of said metal-based catalyst is in the range between about 0.1 and about 20 percent by weight of said aromatic nitro compound.

14. The process of claim 13 wherein the pressure is maintained in the range between about 30 and about 10,000 p.s.i.g., and the temperature is maintained in the range between about 25° C. and about 250° C.

15. The process of claim 14 wherein said halogenated oxide is selected from the group consisting of thionyl chloride and phosgene.

References Cited

UNITED STATES PATENTS

| | | | |
|---|---|---|---|
| 3,070,618 | 12/1962 | Drummond | 260—453 |
| 3,370,078 | 2/1968 | Bennett et al. | 260—453 |

FOREIGN PATENTS

| | | |
|---|---|---|
| 651,876 | 2/1965 | Belgium. |
| 993,704 | 6/1965 | Great Britain. |

CHARLES B. PARKER, Primary Examiner

D. H. TORRENCE, Assistant Examiner

U.S. Cl. X.R.

252—454, 455, 457, 459, 460, 463, 467, 472, 475, 476; 260—2.5, 77.5, 243, 465, 471, 543, 544, 599, 600, 612, 645, 646, 650, 689, 694